United States Patent Office 3,445,453
Patented May 20, 1969

3,445,453
YELLOW MONOAZO PIGMENTS HAVING A GREENISH TINT
Emil Stocker, Riehen, Switzerland, assignor to
J. R. Geigy A.G., Basel, Switzerland
No Drawing. Filed July 1, 1966, Ser. No. 562,112
Claims priority, application Switzerland, July 9, 1965,
9,638/65
Int. Cl. C09b 45/18; C09d 3/32, 11/02
U.S. Cl. 260—193                                        1 Claim

ABSTRACT OF THE DISCLOSURE

Yellow monoazo pigments are disclosed having the formulas:

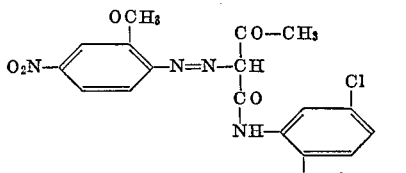

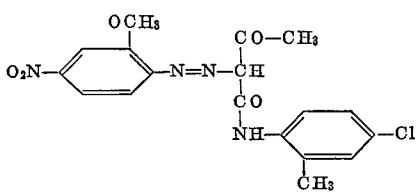

and

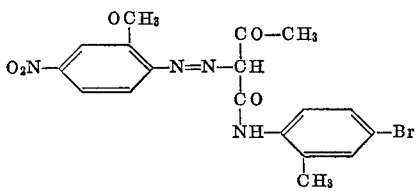

Also provided are multicolor prints comprising a pigment combination consisting essentially of a yellow component of the above formula together with a blue copper phthalocyanine pigment.

---

The present invention concerns new yellow monoazo pigments having a greenish tint, the pigment of high-molecular organic materials therewith, as well as, as industrial products, materials pigmented with these new pigments.

Nowadays, the graphical printing industry requires pigments, for the use in printing inks especially for multi-color printing which satisfy a large number of conditions among which are, in particular, high color strength, a pure shade property possessing high brilliancy, good light fastness and satisfactory resistance to those solvents which are frequently employed in such printing processes.

Moreover, printing inks containing these pigments should retain good flowability, even when having a high pigment content, and the prints obtained therewith should have transparency and gloss as well as good fastness to overlacquering and to water.

The need for strongly colored, brilliant pigments of yellow shade having good fastness to light for the production of, in particular, printing inks for multi-color printing is well known. In particular, pigments of pure, greenish yellow shade, e.g. as proposed in the Standard prescription CEI 12–64 of the European Color Scale for typographic printing are wanted, which greenish yellow pigments in combination with or in multi-color printing with blue pigments, should afford brilliant green shades. Pigments that have been known to satisfy the above requirements to a large extent suffer from the serious drawback that their production involves the use of 3,3-dichlorobenzidine which is hazardous to the health of personnel employed in such production.

Monoazo pigments have now been produced by me which largely satisfy the aforesaid demands while their production avoids the above-mentioned hazards to the health of persons involved therein.

The pigments according to the invention are of the formulas

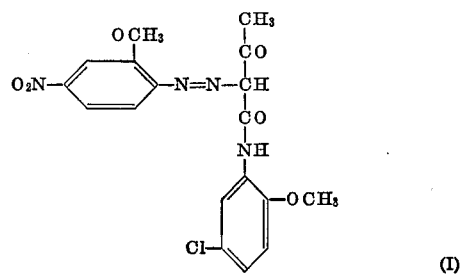

(I)

and

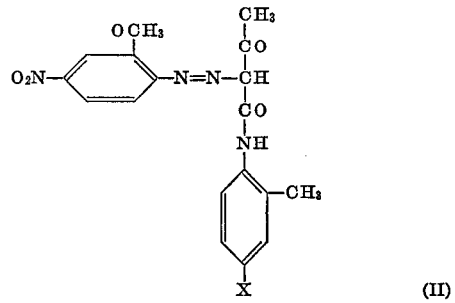

(II)

X in Formula II representing chlorine or bromine.

These novel pigments are produced by coupling the diazonium compound of 1-amino-2-methoxy-4-nitrobenzene with a compound of the formula

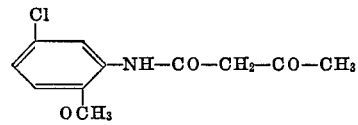

or

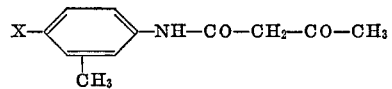

respectively, X in the latter formula having the same meaning as in Formula II.

The coupling is advantageously performed in aqueous, preferably weakly acid, particularly acetic acid, solution or suspension. To accelerate the coupling or influence the form of the pigment formed, auxiliaries known per se can be added to the coupling mixture, for example, inert organic solvents which are miscible with water such as low alkanols, e.g. methanol, ethanol, ethylene glycol monomethyl or monoethyl ether, low aliphatic acids, such as formic acid or acetic acid, low fatty acid amides as dimethyl formamide or certain tertiary nitrogen bases, e.g. triethanolamine or pyridine, also organic solvents which are not miscible with water such as optionally halogenated or nitrated aromatic hydrocarbons, e.g. benzene, toluene, chlorobenzene, nitrobenzene or tetrahydronaphthalene which are used preferably in small amounts, also non-ionogenic, anion active or cation active dispersing agents—as such addition products of a multiple stoichiometric amount of alkylene oxide, particularly ethylene oxide, with fatty alcohols or fatty acids are particularly suitable, moreover condensation products of naphthalene sulphonic acids with formaldehyde—also rosins or rosin soaps, protective colloids such as casein or methyl cellulose, also oils, plasticisers or solid colorless substrate such as barium sulfate or alumina white.

The new monoazo pigments precipitate from the reaction mixture immediately after the coupling. They are isolated and purified in the usual way, by filtration and washing. Depending on the intended use, the crude pigment filter cake can be dried and ground, worked up into aqueous slurries and pastes or flushed into organic media. The pigments can also be worked up with auxiliaries such as carrier resins into granular or pulverulent preparations.

To improve the color strength and/or change the shade, if desired the new pigments can also be produced in admixture with each other or with other pigments. Thus, for example, up to 30%, or even 40% of the diazo component or coupling component can be replaced by another diazo component of the nitraniline series or by another coupling component of the aceto-acetanilide series.

The monoazo pigments according to the invention are suitable for the pigmenting of high molecular organic materials, chiefly of printing inks for the graphic industry, mainly for paperprinting. The pigments can also be used, however, for other purposes, e.g. in paints based on drying oils, such as in linseed oil colors, or having an aqueous base such as in emulsion paints, in paints of various types such as nitro, alkyd or stoving paints, for the production of wall papers and for paper coating, for coloring paper in the pulp, for paper laminates, also for the pigmenting of synthetic plastics such as polyethylene, polystyrene, polyvinyl chloride particularly rigid polyvinyl chloride, as well as thermosetting resins, of cellulose esters, particularly for the coloring of viscose or acetate silk in the spinning mass, as well as for pigment printing and the padding of textiles as well as many others.

The new pigments color these materials in pure greenish yellow shades having great color strength and the colorings are fast to light. Compared with other pigments of this class, the fastness to oil and solvents of the new yellow pigments is very satisfactory. When used in graphical color printing, they show very good rheological properties. Prints produced with the pigments according to the invention obtained by adding rosin during the coupling thereof are distinguished by a beautiful gloss and good transparency. Transparency is very desirable particularly in multi-color printing and in the coloring of viscose rayon spinning masses. The great color strength of the new pigments makes it possible to produce therefrom easily flowing, strongly colored printing inks, and with these thin films of print can be attained.

The fact that the coupling product according to the invention have all these valuable properties in combination is particularly surprising since hitherto known pigments lack especially one or the other of the important properties, namely, either the good rheological properties in binding agents or the pure greenish yellow shade or the high color strength or the light fastness.

Compared with the important known yellow pigments of the benzidine series, the new pigments have the advantage that 3,3'-dichloro-benzidine, which is injurious to health, is not needed for their production. Compared with the pigment from diazotised 1-amino-2-methoxy-4-nitrobenzene and acetoacet-(2-chloroanilide) described in U.S. Patent 1,051,565, the new pigments have the advantage of much superior color strength and substantially greater light fastness, for example, when used in printing inks.

The new pigments are also much purer and of greater color strength than the known yellow pigment from 1-amino-2-nitro-4-chlorobenzene and acetoacet-(2-methyl-3-chloro-anilide) described in U.S. Patent 2,374,064 and much stronger than the yellow pigment from 1-amino-2-nitro-4-chlorobenzene and acetoacet-(2-methyl-4-chloroanilide), described in U.S. Patent 3,165,507.

The new pigments are also distinguished from the pigment obtained from 1-amino-2-methoxy-4-nitro-benzene and acetoacet-(2-methoxyanilide) described in U.S. Patent 3,032,546 by their greenish yellow shade which substantially corresponds to the above-mentioned CEI Standard without requiring admixture of the new pigment with other pigments. In combination with suitable blue pigments, they afford unexpectedly pure green shades, whilst the last-mentioned known pigment in mixture with identical blue pigments only affords considerably duller green shades.

Comparisons with monazo pigments from the isomeric 1-amino-2-nitro-4-methoxybenze described in German Patent No. 461,499 show that the known pigments have less desirable reddish yellow shades. Other yellow pigments from acetoacet-(2-methoxy-5-chloro-4-nitro-anilide) according to German Patent No. 402,869 are much more complicated to produce and, in addition, are of much inferior fastness to light and of inferior color strength compared with the new pigments according to the invention.

The new pigments combine quite unexpectedly and to an extent not hitherto attained, great color strength, a pure greenish yellow shade, very good fastness to light, sufficient solvent and overlacquering fastness for printing inks, low oil absorption and very good rheological properties; in addition prints can be made therewith having a good gloss and transparency. This combination of various valuable properties is particularly surprising as, apart from the above-mentioned known unsatisfactory pigments, a structurally closely related yellow pigment produced from diazotised 1-amino-2-methoxy-4-nitrobenzene and acetoacet-(3-chloro-anilide) exhibits only low color strength and is badly lacking in fastness to light.

The following non-limitative examples illustrate the invention further. Temperatures are given therein in degrees centigrade. Percentages are given by weight unless expressly stated otherwise.

Example 1

1.68 g. of 1-amino-2-methoxy-4-nitrobenzene are dissolved in 50 ml. of glacial acetic acid, whereupon 12 ml. of 10 N hydrochloric acid are added to the solution. Shortly afterwards a solution of 0.76 g. of sodium nitrite in 190 g. of water is quickly added to this stirred mixture, the diazonium salt solution so obtained is stirred for another three minutes at room temperature, 60 ml. of 2 N sodium acetate solution are added thereto and then coupling is performed immediately by adding dropwise within 3 minutes a solution of 2.49 g. of acetoacet-(2-methoxy-5-chloro-anilide) in 50 ml. of methanol to the diazonium salt solution. The pigment suspension formed is then heated for 5 minutes at 56–58°, filtered under suction, the residue is washed neutral with water, dried at 50° and pulverized.

The pigment so produced is excellently suitable for the production of printing inks for the graphic industry, having good rheological properties, and yields very strong, pure, greenish yellow prints having good gloss and transparency and very good fastness to light. In combination with blue printing inks very pure green shades can be obtained, e.g., in multi-color printing. This pigment is of the structure shown in Formula I.

Example 2

8.40 g. of 1-amino-2-methoxy-4-nitrobenzene are sprinkled, as a fine powder, into 75 ml. of 2 N hydrochloric acid while stirring and the whole is stirred for another 2 hours at 25°. 60 g. of crushed ice are then added to the mixture and the amine is diazotised at 0 to 2°, by the dropwise addition of 10.35 g. of 33.3% sodium nitrite solution, for about 1 hour.

Also, 12.65 parts of acetoacet-(2-methoxy-5-chloroanilide) are dissolved in 400 g. of water and 37.5 ml. of 2 N sodium hydroxide solution at 20°, 25 ml. of 2 N sodium acetate solution, 1.25 g. of an addition product of 20 mols of ethylene oxide and stearyl alcohol, and 150 g. of ice are added to the solution and then, while continuously stirring, 45 ml. of 2 N acetic acid are added to this mixture at 3 to 5°.

The cold diazonium salt solution is then clarified and poured into the fine suspension of the coupling component so produced, the addition being made within 30 minutes while stirring, and then the temperature is raised to 40° within 1 hour. The pigment formed is then filtered off under suction, washed neutral, dried at 50° and pulverised. In printing inks, it produces strong and pure greenish yellow prints similar to those produced by the pigment obtained according to Example 1.

By adding 4.0 g. of 45% rosin soap (sodium salt), dissolved in 40 ml. of water, to the alkaline solution of the coupling component and otherwise the same procedure as described above is followed, then a yellow pigment is obtained which affords letterpress printings having particularly high transparency and a beautiful gloss.

Example 3

168 g. of 1 - amino - 2 - methoxy - 4 - nitrobenzene are sprinkled, as a fine powder, into a mixture of 300 ml. of 10 N hydrochloric acid and 1200 ml. of water while stirring and the suspension obtained is stirred overnight. 1200 g. of crushed ice are then added to the mixture and the amine is diazotised at 0 to 5°, by the addition of 207 g. of 33.3% aqueous sodium nitrite solution for about 10 minutes. With slightly positive nitrite reaction stirring is continued in the cold for 1 hour.

Separately, 256 g. of acetoacet-(2-methoxy-5-chloroanilide) are dissolved in 4500 ml. of water and 200 g. of 30% sodium hydroxide solution at 20°, whereupon the solution obtained is mixed with 85 g. of crystalline sodium acetate and 25 g. of an addition product of 20 mols of ethylene oxide and stearyl alcohol, dissolved in 250 ml. of water, 2000 g. of ice are added and then, while continuously stirring, 135 g. of 80% acetic acid are added within 10 minutes to the solution at 0 to 5°.

The filtered cold diazonium salt solution is then poured into the fine suspension of the coupling component so produced, the addition being made within 30 minutes while stirring and the temperature being kept below 10° by the further addition of ice. The pigment suspension formed is then heated within two hours to 40° by the introduction of steam into the suspension. If some diazonium compound can still be traced, a small amount of the coupling component, dissolved in dilute sodium hydroxide solution, is added thereto until the diazo reaction is negative.

The pigment formed is then filtered off, washed neutral, dried at 60° and pulverised. With the pigment obtained printing inks for the graphic industry having good rheological properties and very good color strengths can be produced, said printing inks yielding pure and very strong greenish yellow prints having very good fastness to light, a good gloss and a good transparency.

If 80 g. of a 45% rosin soap (sodium salt), dissolved in 800 ml. of water, are added to the alkaline solution of the coupling component and otherwise the same procedure as described above is followed, then a yellow pigment is obtained which yields prints having particularly good transparency and high gloss; moreover, said pigment, when combined with blue printing inks, is excellently suitable for the production of very pure green shades, e.g. in multi-color printing.

Example 4

1.00 g. of the pigment produced according to paragraphs 1 to 4 of Example 3 and 4.00 g. of a litho varnish of the composition:

|  | Percent |
| --- | --- |
| Linseed oil-stand oil (300 poise) | 29.4 |
| Linseed oil-stand oil (20 poise) | 67.4 |
| Cobalt octoate (8% Co) | 2.1 |
| Lead octoate (24% Pb) | 1.3 | are finely ground on an Engelsmann machine and then, with the aid of a cliché, printed onto art printing paper by the letterpress process (1 g./sq.m.). A strong, pure greenish yellow shade is obtained which has good transparency and gloss. In three or four color printing, very brilliant green shades are attained by printing over blue or by printing blue over yellow.

The pigment is also well suited for other printing processes such as gravure, offset, flexographic printing and here too very good results are attained.

Example 5

3.2 g. of the pigment produced as described in paragraphs 1 to 4 of Example 3 are ground with 0.8 g. of the blue copper phthalocyanine (α-form) pigment, 36 g. of alumina white and 60 g. of a litho varnish to obtain a printing ink with which white art printing paper is printed by using a gelatine roller. A strong, pure green color print is obtained.

Example 6

1.68 g. of 1-amino-2-methoxy-4-nitrobenzene are dissolved in a mixture of 25 ml. of glacial acetic acid and 15 ml. of 2 N hydrochloric acid and diazotised at 10° C. with 10.5 ml. 1 N sodium nitrite solution.

A coupling suspension is prepared by dissolving 2.34 g. of acetoacet-(2-methyl-4-chloro-anilide) in 80 ml. of methanol to which 7.5 ml. of 2 N sodium hydroxide solution has been added. 0.35 g. of the condensation product of octadecanol and ethylene oxide in a molar ratio of 1:20, dissolved in 7.0 ml. of water, and 8.0 ml. of 2 N sodium acetate solution are then added to the coupling solution. The latter is then cooled to 2°, and stirred well while, first 8.0 ml. of 2 N acetic acid and then within 5 minutes the above described clarified diazonium solution are added dropwise thereto. The resulting coupling mixture is then heated in 30 minutes to 40°; the pigment formed is filtered off, washed with water, dried at 55° and pulverized.

Its formula is

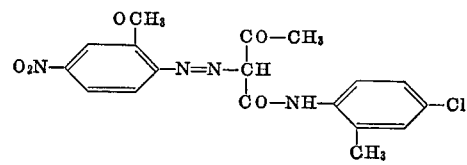

The pigment so produced is excellently suitable for the production of printing inks for the graphic industry, havnig good rheological properties, and yields very strong, pure, greenish yellow prints having very good fastness to light. In combination with blue pigments very pure green shades are obtained.

Example 7

A greenish yellow pigment of similar good properties and still better light fastness is obtained when repeating Example 6, but using in lieu of acetoacet-(2-methyl-4-chloro-anilide) 2.80 g. of acetoacet-(2-methyl-4-bromoanilide).

The formula of this pigment is

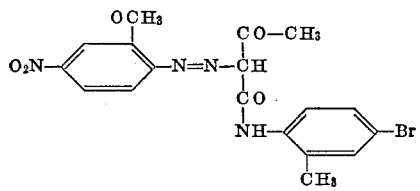

Example 8

8.40 g. of 1-amino-2-methoxy-4-nitrobenzene are sprinkled, as a fine powder, into 75 ml. of 2 N hydrochloric acid while stirring and the whole is stirred for another 2 hours at 25°. 60 g. of crushed ice are then added to the mixture and the amine is diazotised at 0 to 2°, by the dropwise addition of 10.35 g. of 33.3% sodium nitrite solution, for about 1 hour.

Also 11.84 parts of acetoacet-(2-methyl-4-chloro-anilide) are dissolved in 400 g. of water and 37.5 ml. of 2 N sodium hydroxide solution at 20°, 25 ml. of 2 N sodium acetate solution, 1.25 g. of a condensation product of octadecanol and ethylene oxide (molar ratio 1:20) dissolved in 25 ml. of water, and 150 g. of ice are added to the solution and then, while continuously stirring, 45 ml. of 2 N acetic acid are added to this mixture at 3 to 5°, whereby a fine suspension of the coupling component is obtained.

The cold diazonium salt solution is then clarified and poured into the said suspension of the coupling component, the addition being made within 30 minutes while stirring, and then the temperature is raised to 40° within 1 hour. The pigment formed is then filtered off under suction, washed neutral, dried at 50° and pulverized.

Printing inks prepared with this pigment produce strong and pure greenish yellow prints similar to those produced with the aid of the pigment obtained according to Example 6.

By adding 5.0 g. of a 45% rosin soap (sodium salt), dissolved in 50 ml. of water, to the alkaline solution of the coupling component and otherwise following the same procedure as described above, a yellow pigment is obtained which affords letter-press printing having particularly high transparency and a beautiful gloss.

Example 9

By repeating Example 8, but replacing the acetoacet-(2-methyl-4-chloro-anilide) used therein by 14.20 g. of acetoacet-(2-methyl-4-bromo-anilide), a greenish yellow pigment of similar valuable properties and even slightly better light fastness is obtained.

Example 10

1.00 g. of a pigment produced as described in Example 8 and 4.00 g. of a litho varnish of the composition:

| | Percent |
|---|---|
| Linseed oil-stand oil (300 poise) | 29.4 |
| Linseed oil-stand oil (20 poise) | 67.2 |
| Cobalt octoate (8% Co) | 2.1 |
| Lead octoate (24% Pb) | 1.3 | are finely ground on an Engelsmann machine and then, with the aid of a cliché, printed onto art printing paper by the letter-press process (1 g./sq.m.). A strong, pure, greenish yellow shade is obtained which has good transparency and gloss. In three or four color printing, very brilliant green shades are attained by printing over blue or by printing blue over yellow.

The pigment is also well suited for other printing processes such as gravure, offset, flexographic printing and here too very good results are attained.

Example 11

3.2 g. of a pigment produced as described in Example 9 are ground with 0.8 g. of copper phthalocyanine (α-form), 36 g. of alumina white and 60 g. of a litho varnish to obtain a printing ink with which white art printing paper is printed by using a gelatine roller. A strong pure green color print is obtained.

Example 12

Example 11 is repeated, but in lieu of the α-form copper phthalocyanine there is used an equal amount of β-form copper phthalocyanine. A similar, particularly pure green color print is obtained.

I claim:
1. A pigment of the formula

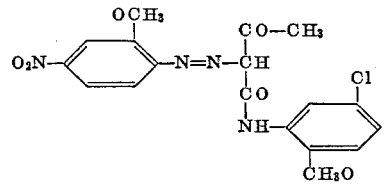

References Cited

UNITED STATES PATENTS
2,112,764  3/1938  Dahlen et al. _____ 260—193

FOREIGN PATENTS
826,083  12/1937  France.
574,463  3/1930  Germany.

CHARLES B. PARKER, *Primary Examiner.*

DONALD B. PAPUGA, *Assistant Examiner.*

U.S. Cl. X.R.

106—22, 228, 288; 117—154; 260—41